US007861259B2

(12) United States Patent
Barone, Jr.

(10) Patent No.: US 7,861,259 B2
(45) Date of Patent: Dec. 28, 2010

(54) INTERACTIVE TELEVISION TRACKING SYSTEM

(75) Inventor: Samuel T. Barone, Jr., Culver City, CA (US)

(73) Assignee: Goldpocket Interactive, Duluth, GA (US)

( * ) Notice: Subject to any disclaimer, the term of this patent is extended or adjusted under 35 U.S.C. 154(b) by 1547 days.

(21) Appl. No.: 10/222,445

(22) Filed: Aug. 16, 2002

(65) Prior Publication Data

US 2003/0051253 A1    Mar. 13, 2003

Related U.S. Application Data

(60) Provisional application No. 60/312,848, filed on Aug. 16, 2001, provisional application No. 60/312,846, filed on Aug. 16, 2001.

(51) Int. Cl.
*H04N 7/10* (2006.01)
(52) U.S. Cl. .............................. 725/32; 725/10; 725/34; 725/35; 725/36
(58) Field of Classification Search .................. 725/10, 725/9, 23, 32–34, 46
See application file for complete search history.

(56) References Cited

U.S. PATENT DOCUMENTS

| 5,396,546 | A | | 3/1995 | Remillard |
| 5,410,344 | A | | 4/1995 | Graves et al. |
| 5,446,919 | A | * | 8/1995 | Wilkins ........................ 725/35 |
| 5,561,709 | A | | 10/1996 | Remillard |
| 5,576,755 | A | | 11/1996 | Davis et al. |
| 5,697,844 | A | * | 12/1997 | Von Kohorn ................. 463/40 |
| 5,758,259 | A | | 5/1998 | Lawler |
| 5,760,821 | A | | 6/1998 | Ellis et al. |
| 5,774,664 | A | | 6/1998 | Hidary et al. |
| 5,872,588 | A | | 2/1999 | Aras et al. |
| 5,973,683 | A | | 10/1999 | Cragun et al. |
| 5,974,398 | A | | 10/1999 | Hanson et al. |
| 5,977,964 | A | | 11/1999 | Williams et al. |
| 5,995,943 | A | | 11/1999 | Bull et al. |
| 6,002,694 | A | | 12/1999 | Yoshizawa et al. |
| 6,025,868 | A | | 2/2000 | Russo |

(Continued)

FOREIGN PATENT DOCUMENTS

GB    2343095 A    4/2000

(Continued)

OTHER PUBLICATIONS

WO01/91474, David, Kinder et al.*

(Continued)

*Primary Examiner*—Andrew Y Koenig
*Assistant Examiner*—Anthony Bantamoi

(57) ABSTRACT

An interactive television system tailoring delivery of interactive content. The system includes a request processing engine accepting user interactions with an interactive television (ITV) application. A user profiling engine associates the user interactions with an individual profile or profile group. The profile group defines events that may be triggered upon receipt of certain user interactions. A trigger/event engine monitors, in real-time, whether the user interactions correspond to any of the defined events. If an event is to be triggered, an action engine transmits an ITV command associated with the event to an encoder. The encoder performs a real-time of encoding of the ITV command for providing viewers with a dynamic ITV experience. The ITV experience provided to the viewers may also be customized based on the profile information obtained for each individual viewer.

24 Claims, 3 Drawing Sheets

U.S. PATENT DOCUMENTS

| | | | |
|---|---|---|---|
| 6,057,872 A * | 5/2000 | Candelore | 725/23 |
| 6,163,316 A | 12/2000 | Killian | |
| 6,173,271 B1 | 1/2001 | Goodman et al. | |
| 6,209,130 B1 | 3/2001 | Rector, Jr. et al. | |
| 6,215,483 B1 | 4/2001 | Zigmond | |
| 6,229,532 B1 | 5/2001 | Fujii | |
| 6,604,224 B1 | 8/2003 | Armstrong et al. | |
| 6,760,916 B2 * | 7/2004 | Holtz et al. | 725/34 |
| 6,813,776 B2 | 11/2004 | Chernock et al. | |
| 6,925,649 B2 | 8/2005 | Schwalb et al. | |
| 7,058,963 B2 * | 6/2006 | Kendall et al. | 725/21 |
| 7,082,198 B1 | 7/2006 | Ishii | |
| 7,117,518 B1 * | 10/2006 | Takahashi et al. | 725/86 |
| 7,134,131 B1 | 11/2006 | Hendricks et al. | |
| 7,146,627 B1 * | 12/2006 | Ismail et al. | 725/47 |
| 2001/0047515 A1 | 11/2001 | Schreer | |
| 2002/0056087 A1 * | 5/2002 | Berezowski et al. | 725/9 |
| 2002/0059586 A1 | 5/2002 | Carney et al. | |
| 2002/0078441 A1 * | 6/2002 | Drake et al. | 725/9 |
| 2002/0083443 A1 | 6/2002 | Eldering et al. | |
| 2002/0087970 A1 | 7/2002 | Dorricott et al. | |
| 2003/0023973 A1 | 1/2003 | Monson et al. | |
| 2003/0093792 A1 * | 5/2003 | Labeeb et al. | 725/46 |
| 2003/0115586 A1 | 6/2003 | Lejouan et al. | |
| 2004/0049786 A1 * | 3/2004 | Bauminger et al. | 725/46 |
| 2005/0028208 A1 | 2/2005 | Ellis et al. | |
| 2007/0130581 A1 | 6/2007 | Del Sesto et al. | |

FOREIGN PATENT DOCUMENTS

GB  2348346 A  9/2000

OTHER PUBLICATIONS

UK Examination Report for App. No. GB0402922.9 dated Nov. 30, 2004 (1 page).

Co-pending U.S. Appl. No. 10/222,697, filed Aug. 16, 2002, Entitled: Content Rating, Advisory and Profiling System for Interactive Television.

Co-pending U.S. Appl. No. 10/222,704, filed Aug. 16, 2002, Entitled: Digital Data Monitoring and Logging in an ITV System.

International Search Report dated Oct. 29, 2002 from corresponding PCT application No. PCT/US02/26021 filed Aug. 16, 2002.

* cited by examiner

INTERACTIVE TELEVISION TRACKING SYSTEM

CROSS-REFERENCE TO RELATED APPLICATIONS

This application claims the benefit of U.S. Provisional Application No. 60/312,848 filed Aug. 16, 2001 and U.S. Provisional Application No. 60/312,846 filed Aug. 16, 2001, the contents of both of which are incorporated herein by reference.

FIELD OF THE INVENTION

The present invention relates to techniques for the provision of interactive television (ITV) content associated with a television program, and more particularly, to tracking user interactions with current ITV content for tailoring delivery of the ITV content.

BACKGROUND OF THE INVENTION

Interactive television (ITV) combines conventional television with additional content (interactive content) to present a viewer with an enhanced version of a television program or commercial. As used herein, the term interactive content refers to any additional information that is used to supplement a TV signal and create an enhanced program.

Typically, the interactive content is in some way related to the television program being viewed, such as biographical information about one of the actors in the program, additional information about a topic covered in the program, and the like. If the television program is a game show, the interactive content often allows the viewer to play along with the game. For example, a viewer may answer the same questions as the contestants on the game show. The interactive content may also be associated with television commercials that a user may interact with to retrieve additional information on products and/or to purchase the products.

In order to allow a viewer to experience an enhanced television program, a television program is encoded with ITV data and broadcast to the viewers. The ITV data may take many forms, such as, for example, HTML, XML, JAVA, or JAVA Script commands. If the receiving viewer's television system is equipped with an ITV receiver, the ITV receiver may decode the embedded ITV data for accessing the associated interactive content or performing an action indicated by the command.

Today, one form of interactive television delivery depends on World Wide Web (Web) technology for delivering and viewing the enhanced content. Specific web sites, addressed with URLs, are created and maintained as ITV sites. The content in these sites may be viewed with an ITV receiver in the same way a computer browses a web site. The ITV receiver typically includes a web browser, and can display downloaded ITV content along with TV video on a conventional television set. The ITV receiver typically obtains a majority, if not all, of the ITV web content via one of the ITV web sites. The sites that are accessed and how content is displayed is determined by the ITV data contained in the video portion of the television program. One method for encoding ITV links and triggers is specified in "EIA-746-A: Transport of Internet Uniform Resource Locator Information Using Text-2 (T-2) Service," September 1998, the content of which is incorporated herein by reference. Another form of interactive television delivery relies on application server technology in combination with head-end integration with cable and satellite networks.

In order to encourage users to engage and continue to stay engaged with an ITV application, it is desirable to have a system and method that provides dynamic ITV content based on one's activities with the ITV application as well as activities of other viewers. Such a system and method should also provide customized ITV content based on the user's profile information in order to keep the viewer's interest.

SUMMARY OF THE INVENTION

This invention is directed to an interactive system and method for tracking viewer activities with and/or within an ITV application/content. The type of experience provided by the ITV application is dynamically modified based on the viewer activities and/or profile information.

According to one embodiment of the invention, a method for tailoring delivery of interactive content in an interactive television system includes delivering a video program providing an interactive television program application to a viewer, the interactive television program application presenting the viewer with a first type of interactive experience, monitoring interactions with the interactive television program application, and dynamically inserting a command into the video program based on the monitored interactions for presenting the viewer with a second type of interactive experience during the video program.

According to another embodiment of the invention, the second type of interactive experience is customized based on the viewer receiving the interactive experience.

In a further embodiment of the invention, the method for tailoring delivery of interactive content includes transmitting a first portion of a video program providing an interactive television program application to a first viewer and a second viewer, receiving an interaction with the interactive television application from the first viewer, determining whether an event is to be triggered based on the interaction from the first viewer, encoding a command associated with the event in a second portion of the video program, and transmitting the second portion of the video program with the encoded command for providing the event to the first viewer and the second viewer.

In yet another embodiment of the invention, the method for tailoring delivery of interactive content in an interactive television system includes receiving a viewer interaction with an interactive television application provided by a video program, identifying a profile for the viewer, identifying a customized interactive television content based on the matched profile, and providing the customized content to the viewer.

It should be appreciated, therefore, that the present interactive system and method allows the tailoring of delivery of ITV content based on user interactions and/or preferences. Such tailored ITV content provides a dynamic experience that helps viewers stay engaged with the ITV content for longer and more frequent periods of time. In addition, because the ITV content may also be customized based on user preferences, the ITV content that is delivered is aimed to be to the liking/interest of the individual viewers.

These and other features, aspects and advantages of the present invention will be more fully understood when considered with respect to the following detailed description, appended claims, and accompanying drawings. Of course, the actual scope of the invention is defined by the appended claims.

DETAILED DESCRIPTION OF THE INVENTION

Figure 1:
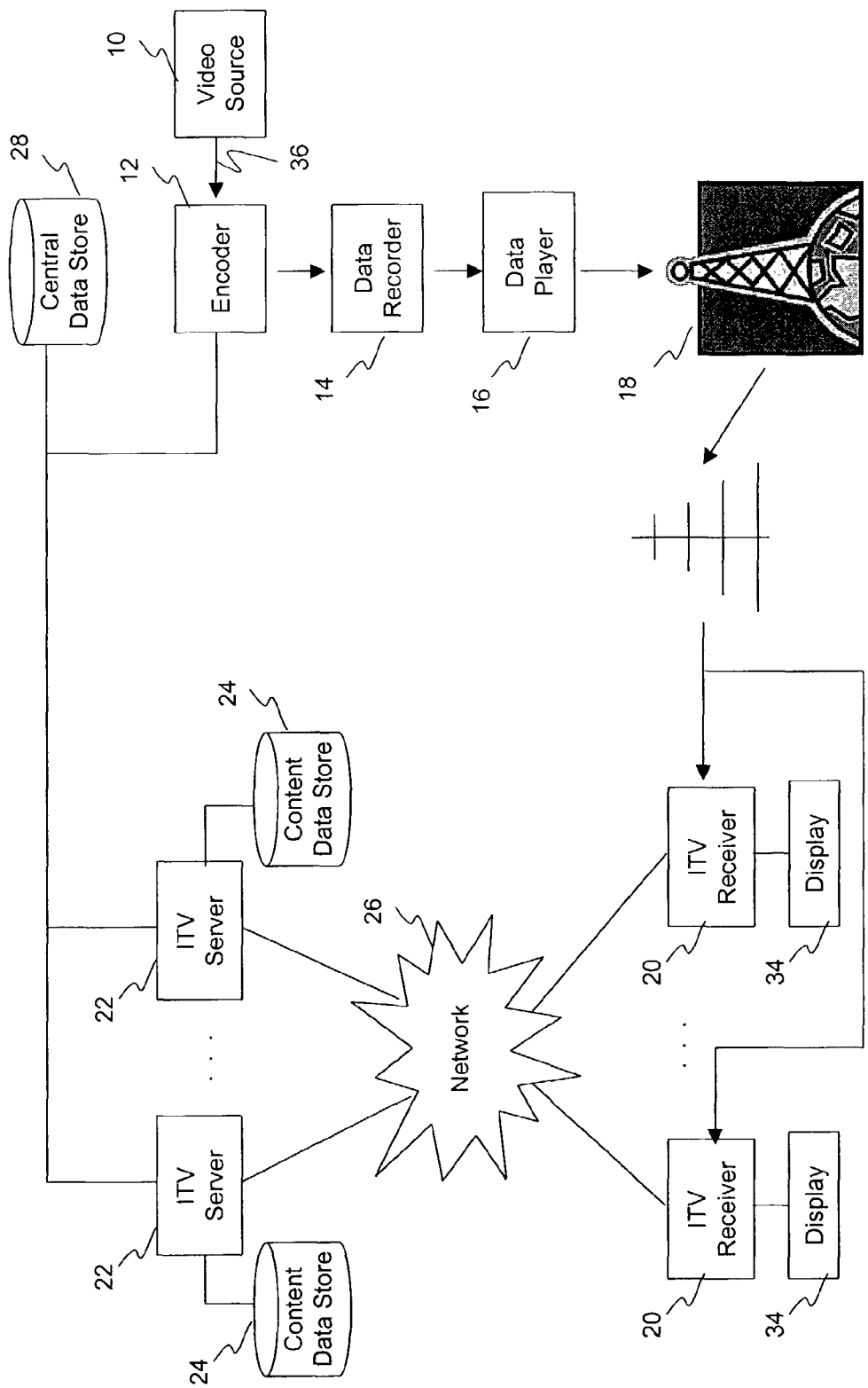
FIG. 1 is a schematic block diagram of an interactive television (ITV) system according to one embodiment of the invention.

FIG. 1 is a schematic block diagram of an interactive television (ITV) system according to one embodiment of the invention. The system according to the illustrated embodiment maintains real-time track of interactions of specific individual users or groups of users with ITV content/applications associated with a television program or commercial (collectively referred to as a television program). The system then provides a dynamic interactive experience during the television program based on such interactions and/or profile information. The system may also tailor the schedule of delivery of such interactive experience based on the interactions being tracked.

The ITV system illustrated in FIG. 1 includes an encoder 12 coupled to a video source 10 over a serial or network link 36, such as for example, a local area network (LAN) or wide area network (WAN) link. The video source 10 may be a camera, VCR, betacam, DVD player, PC, CD-ROM player, or any other device capable of delivering live or recorded video programs to the encoder for embedding ITV data into the video program. The ITV data may be embedded, for example, in the vertical blanking interval (VBI) (for example, line 21), or an MPEG 2 private data field (or a similar field of additional video formats) of the video portion of the program. The ITV data may be triggers, HTTP, XML, JAVA, or JAVA SCRIPT commands, URLs, and/or other type of ITV links, triggers, data sources, timing information, and data conventional in the art.

The encoder 12 may be an encoder conventional in the art, such as, for example, a DV2000 universal data encoder or ITV Injector, marketed by Ultech LLC, Middlebury, Conn. The encoder is configured to embed appropriate ITV data in the video program based on an analysis of user interactions with an ITV application or viewer profile information. According to one embodiment of the invention, the ITV data is embedded and/or modified in real-time as the video program is transmitted to a viewer. Alternatively, the ITV data is embedded ahead of time, prior to the transmission of the video program. In yet another embodiment, the ITV data may be transmitted out-of-band to an ITV receiver via a back channel.

The video program is transmitted, along with the embedded ITV data, utilizing conventional transmission equipment such as, for example, a data player 16 and broadcast station 18. A person skilled in the art should appreciate that the video program may also be transmitted via other types of communication channels such as, for example, cable networks, satellite networks, computer networks, and the like.

Upon receipt of the video program with the embedded ITV data by an ITV receiver 20, the viewer is given an option to receive the enhanced experience provided by the ITV data. In a typical scenario, if the viewer chooses the enhancements, the ITV receiver 20 establishes a connection with an ITV server 22 over a network 26 using a back channel 32. The back channel may take the form of any type of communication channel known in the art, such as, for example, a cable connection, a telephone connection, broadband connection, or any other wired or wireless connection. The network 26 accessed via the back channel may be a private local area network, wide area network, cable network, satellite network, or the like. Upon establishing the connection, the ITV receiver 20 receives an ITV content/application from the ITV server 22 or executes a command embedded in the video signal for producing an interactive experience.

According to one embodiment of the invention, the ITV servers 22 are application servers with appropriate software and hardware for receiving and processing data received from the ITV receivers 20. The data may include content requests, player registration information (e.g. for game shows), purchase transaction information, score submissions, and/or other types of data and requests.

If the data is for providing ITV content to the ITV receiver 20, the ITV server 22 accesses its content data store 24 for retrieving the appropriate ITV content to be delivered to the ITV receiver. The content data store 24 may take the form of any mass storage device known in the art such as a hard disk drive or drive arrays. The data store may also run as an integral part of the ITV server 22. The ITV content stored in the content data store 24 and delivered by the ITV server 22 is also referred to as an ITV application.

The ITV servers 22 are interconnected over a network for transmitting data to and from the servers and other network devices, such as, for example, a central data store 28 and the encoder 12. The network may be, for example, a private local area network or a wide area network. Although the central data store 28 and ITV server 22 are depicted as being physically separate, a person skilled in the art should recognize that they may run on the same hardware.

According to one embodiment of the invention, the central data store 28 stores user profile information, player registration data, purchase transaction information, interaction information with ITV applications, user statistics information, and/or any other data useful for analyzing user interests and habits as well as maintaining track of milestones reached by the users individually, or as a group, for tailoring, in real-time, the delivery of future ITV content based on the gathered information. The central data store 28 may also store the ITV content stored in all or a portion of the content data stores 24 hosted by the ITV servers 22. The information in the central data store 28 may be used to generate end user reports and perform other non real-time functions so as to relieve the burden on the ITV servers to process the real-time functions.

It should be understood by those skilled in the art that FIG. 1 illustrates a block diagram of an ITV system without obfuscating inventive aspects of the present invention with additional elements and/or components which may be required for creating the ITV system. These additional elements and/or components, which are not shown in FIG. 1 are well known to those skilled in the art. For instance, the ITV system may include a switch or router for routing incoming user requests to an appropriate ITV server 22 based on load analysis and the like.

Figure 2:
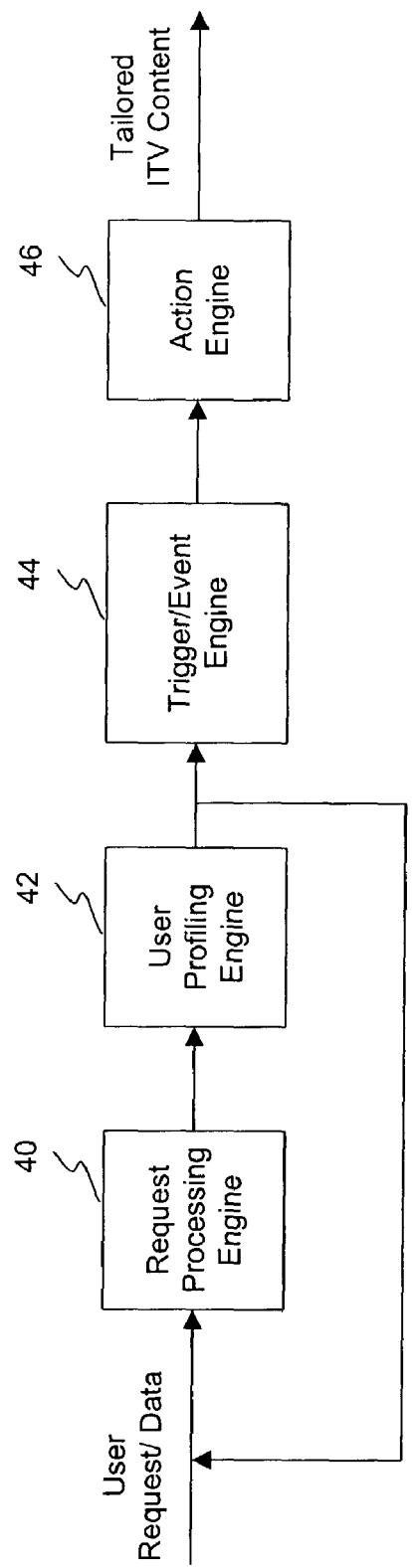
FIG. 2 is a schematic diagram of the components of the ITV system of FIG. 1 for allowing real-time tailoring of ITV content and/or scheduled delivery of such content according to one embodiment of the invention.

FIG. 2 is a more detailed schematic diagram of the components of the ITV system for allowing real-time tailoring of ITV content and/or the delivery schedule of such content according to one embodiment of the invention. These components preferably include a request processing engine 40, a user profiling engine 42, a trigger/event engine 44, and an action engine 46. The various engines may be implemented as software tasks running on a single machine, such as a single network server or platform computer (e.g. a single ITV server 22), or tasks running on two or more separate machines. The components may further be part of tasks running on the ITV server side, ITV receiver side, or a combination of both.

The request processing engine 40 accepts inputs from individual ITV applications and/or processes individual user requests for services such as, for example, player registrations, ITV application game score submissions, commerce requests, profile input request, and other requests submitted within or outside an ITV application. The request processing engine 40 further monitors user interactions within and/or with an ITV application, such as, for example, user selection of particular types of information provided by the application.

The user profiling engine 42 tracks and aggregates individual user inputs based on defined criteria, and groups the inputs together for building individual or group-based trend profiles. Exemplary criteria may be age, gender, time of interaction within the program, geographical data, time of day, frequency of use, depth to which a user participates in a multi-tiered ITV experience, and the like.

For example, the profiling engine 42 may be programmed with a criteria to record all activity from female users between the ages of 18-25, and use the activity information for generating or updating a group profile associated with such group. The profiling component may also be programmed with a criteria to record everything submitted from each user. The user interactions within an ITV application may be detected, for example, by maintaining various click IDs corresponding to different portions of the application according to conventional methods.

The profiling engine 42 may also be programmed to receive an individual user's profile information such as the user's name, home address, telephone number, demographics information, favorite television channels, programs, and/or category of programs, hobbies, family structure (children, pets, etc.), and the like. The profiling engine 42 may then match the user to a particular profile group based on the user's monitored interactions and/or the user's profile information. Alternatively, individual profiles may be created and used for each user for tailoring ITV content based on the user's individual profile.

The trigger/event engine 44 allows the defining and triggering of particular types of ITV content or experience based on data gathered by the profiling component. The trigger/event engine preferably monitors, in real-time, individual user profiles and/or group profiles created and updated by the profiling component, searching for activity from any of the viewers matching the profile, that corresponds to one or more event triggers defined for the profile. In this regard, the trigger/event component maintains a table of various event triggers and associated event messages. When an activity corresponding to an event trigger is detected, a corresponding event message is retrieved from the table and transmitted to the action engine 46. For example, an event trigger may be that 25,000 users have begun to interact with show "XYZ," and the corresponding event may be to notify the action engine 46 with a message indicating that a particular minimum number of viewers have begun interacting.

The action engine 46 receives an event message from the trigger/event engine 44 and notifies external systems that a predetermined event has taken place. According to one embodiment of the invention, the action engine 46 queues and delivers ITV command messages associated with the event, to external systems such as broadcast automation systems. In this regard, the action engine 46 maintains a table of ITV commands associated with particular event messages. The action component delivers one or more ITV commands to the encoder 12 for causing the encoder to insert the commands into the video program in real-time. Alternatively, the commands are delivered to the ITV receivers out-of-band via a back channel. The dynamically inserted ITV commands allow viewers to have a new ITV experience associated with those commands.

For example, upon receipt of an event message indicating that a minimum number of viewers have begun interacting with a particular show, the action engine 46 may insert an ITV command into the current video program to provide each player with an X number of bonus points. Thus, viewers tuned to the particular video program may have a dynamic ITV experience based on their own activities as well as the activities of other viewers.

Figure 3:
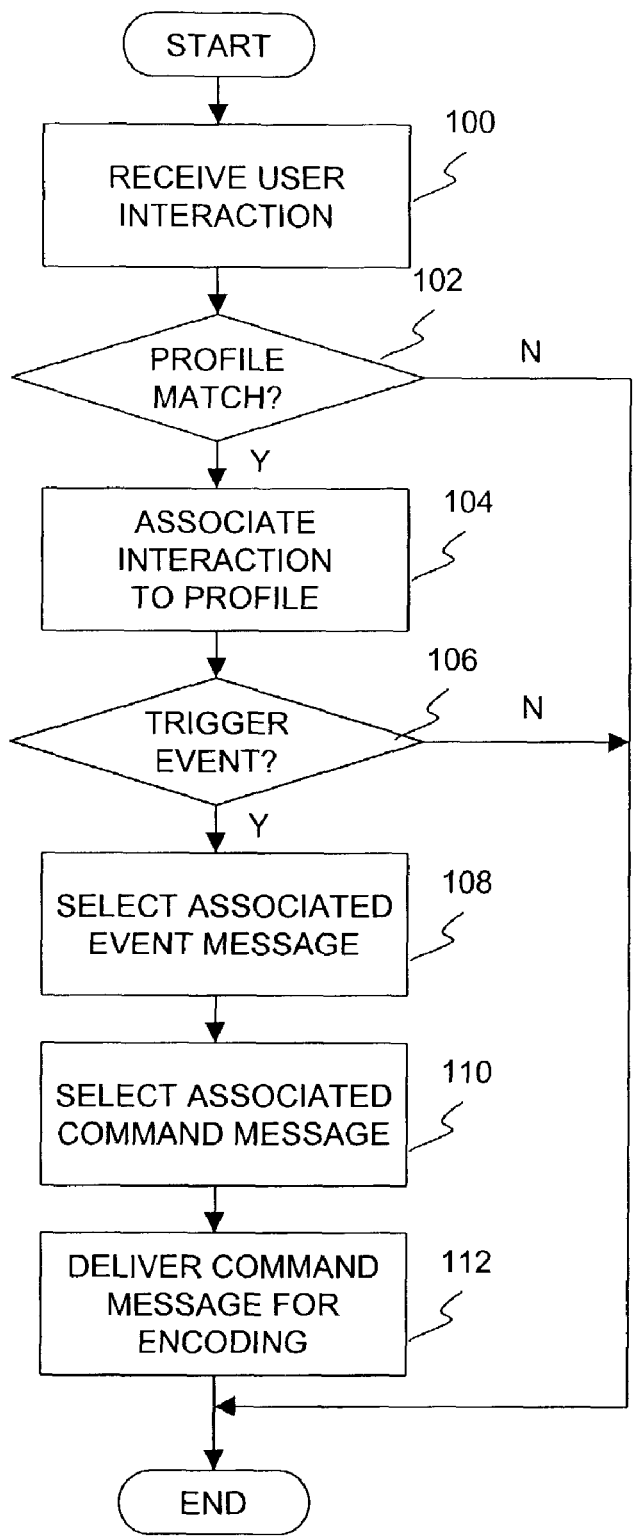
FIG. 3 is a flow diagram of a process for real-time encoding of ITV data based on real-time tracking of user interactions according to one embodiment of the invention.

FIG. 3 is a flow diagram of a process for real-time encoding of ITV data based on real-time tracking of user interactions according to one embodiment of the invention. The process starts, and in step 100, the ITV server 22 receives data of a user interaction from one of the viewers of a particular ITV program. The interaction data is preferably processed by the request processing engine 40 and forwarded to the user profiling engine 42. The profiling engine 42 determines, in step 102, whether viewer providing the interaction may be matched to an individual or group-based-trend profile. If the answer is YES, the user interaction information is recorded and associated with the matched profile in step 104.

In step 106, the trigger/event engine 44 determines if the user interaction is a trigger event defined for the matched profile. If the answer is YES, the trigger/event engine retrieves an associated event message from its table in step 108, and transmits it to the action engine 46. The action engine, in step 110, retrieves one or more ITV commands associated with the event message and delivers it to the encoder 12 in step 112 for real-time encoding into the video signal. Alternatively, the ITV commands are not encoded in the video stream, but delivered to the ITV receivers via a back channel.

According to one embodiment of the invention, the ITV command encoded into the video signal provides the users of the ITV receivers 20 with the same dynamic ITV experience. For example, the ITV command may trigger the ITV receivers to retrieve the same ITV content from the content data store 24.

According to another embodiment of the invention, each ITV receiver is provided with a customized ITV experience based on the preference, habit, interest, and other types of profile information of the receiving individual. In this regard, the individual user profile information that may be maintained by the user profiling engine 42 is used in conjunction with the user interaction information to customize the ITV content provided to the individual.

For example, during a live football game where real-time play-by-play game statistics and individual player information is provided via user controllable elements in an ITV application, tracking of a particular user's interactions may disclose that the user spends a significant amount of time interacting with the section of the application that constantly displays game statistics information. In this scenario, the user may be presented, at the end of the game, with the opportunity to easily sign-up for an email delivery service that sends nation-wide game scores and statistics to an email account.

On the other hand, interactions of another viewer of the same football game may reveal that the viewer prefers to interact with individual player sections instead of game statistics. Such a viewer may instead be presented, at the end of the game, with the opportunity to purchase memorabilia of the players that he or she most frequently monitors. This may be accomplished by directing the viewer's ITV receiver to pull the identified ITV content from the ITV server.

In an alternative embodiment of the invention, the ITV server 22 may push the identified ITV content to the viewer's ITV receiver 20. According to this embodiment, the ITV server 22 may have access to multiple logical channels where each logical channel is dedicated to an ITV content that matches a particular group profile. The ITV server 22 switches from one logical channel to another based on the particular profile matched by the viewer.

In a further embodiment of the invention, the ITV receivers 20 may be individually addressable via unique identifiers. According to this embodiment, the identifier matching the particular viewer's ITV receiver may be transmitted in the video signal along with the ITV command to retrieve the identified ITV content.

Alternatively, every ITV receiver may receive a generic command to display ITV content. Upon receipt of the command, each ITV receiver retrieves a personalized ITV content from the ITV server based on the user's profile information maintained at the ITV receiver side.

Furthermore, instead of embedding the ITV commands in the video stream, the ITV receivers may receive out-of-band commands from the ITV servers via an out-of-band/back-channel path. The ITV receivers may then retrieve appropriate ITV content from the ITV servers based on the out-of-band commands.

According to another embodiment of the invention, the ITV system is configured to alter the timing and/or order of the presentation of particular elements of an ITV application based on the viewer profile and/or activity information. For example, if the system monitors over a period of time, that a particular viewer interacts with the ITV applications heavily during the middle of a show and less at the beginning, the most appropriate content, as determined by the system, may be automatically displayed at a time in the program when that particular user is most likely to be interacting with the show.

Although this invention has been described in certain specific embodiments, those skilled in the art will have no difficulty devising variations to the described embodiment which in no way depart from the scope and spirit of the present invention. Moreover, to those skilled in the various arts, the invention itself herein will suggest solutions to other tasks and adaptations for other applications. For example, although the present invention is described in terms of real-time encoding of ITV commands and related information during the transmission of a video program, a person skilled in the art should appreciate that the commands may be pre-encoded in the video program prior to its delivery. It is the applicants intention to cover by claims all such uses of the invention and those changes and modifications which could be made to the embodiments of the invention herein chosen for the purpose of disclosure without departing from the spirit and scope of the invention. Thus, the present embodiments of the invention should be considered in all respects as illustrative and not restrictive, the scope of the invention to be indicated by the appended claims and their equivalents rather than the foregoing description.

The invention claimed is:

1. A method for tailoring delivery of interactive content in an interactive television (ITV) system comprising:

specifying, under control of a computer, a group profile directed to a group of viewers having a shared characteristic;

maintaining a table of a plurality of trigger events and corresponding event messages, each trigger event triggering a specific interactive experience via the corresponding event message;

specifying, under control of the computer, a specific trigger event for the group profile, the specific trigger event being selected from the plurality of trigger events;

storing, under control of the computer, the specific trigger event in association with the group profile;

delivering a television program associated with an interactive television program application to a plurality of viewers, the interactive television program application presenting the plurality of viewers with a first type of interactive experience during the television program;

determining, under control of the computer, whether the plurality of viewers match the group profile by determining whether the plurality of viewers have the shared characteristic;

based on a determination that the plurality of viewers match the group profile, monitoring and aggregating interactions with the interactive television program application by the plurality of viewers, wherein the aggregating includes adding a value associated with a first interaction by a first one of the plurality of viewers to a second value associated with a second interaction by a second one of the plurality of viewers, and outputting an aggregate value in response;

determining, by an ITV server, whether the aggregate value satisfies the specific trigger event stored in association with the group profile;

based on a determination that the aggregate value satisfies the specific trigger event, retrieving, by the ITV server, the event message corresponding to the specific trigger event;

selecting by the ITV server ITV data associated with the event message; and transmitting the selected ITV data to a plurality of receivers associated with the plurality of viewers, wherein each of the plurality of receivers is configured to retrieve ITV content in response to the received ITV data, wherein the retrieved ITV content dynamically modifies, during the television program, the first type of interactive experience presented to the plurality of viewers with a modified interactive experience.

2. The method of claim 1, wherein the trigger event is a predetermined total number of viewers matching the group profile that interact with the interactive television program application.

3. The method of claim 1, wherein the modified interactive experience awards an award to the plurality of viewers matching the group profile.

4. The method of claim 3, wherein the first type of interactive experience is an interactive game without the award awarded to the plurality of viewers matching the group profile.

5. The method of claim 1, wherein the group profile is associated with a particular gender.

6. The method of claim 1, wherein the group profile is associated with a particular age group.

7. The method of claim 1, wherein the interactions of each of the monitored plurality of viewers contribute towards satisfying the specific trigger event.

8. The method of claim 1 further comprising delivering the ITV data for triggering the modified interactive experience to a plurality of television systems accessible to the plurality of viewers, via a back channel.

9. The method of claim 1 further comprising:
updating the group profile based on the monitored interactions.

10. An interactive television (ITV) system tailoring delivery of interactive content, the system comprising:
means for specifying a group profile directed to a group of viewers having a shared characteristic;
a data store storing a table of a plurality of trigger events and corresponding event messages, each trigger event triggering a specific interactive experience via the corresponding event message;
means for specifying a specific trigger event for the group profile, the specific trigger event being selected from the plurality of trigger events;
means for storing the specific trigger event in association with the group profile;
means for delivering a television program associated with an interactive television program application to a plurality of viewers, the interactive television program application presenting the plurality of viewers with a first type of interactive experience during the television program;
means for determining, under control of the computer, whether the plurality of viewers match the group profile by determining whether the plurality of viewers have the shared characteristic;
means for monitoring and aggregating interactions with the interactive television program application by the plurality of viewers based on a determination that the plurality of viewers match the group profile, wherein the aggregating includes adding a value associated with a first interaction by a first one of the plurality of viewers to a second value associated with a second interaction by a second one of the plurality of viewers" and outputting an aggregate value in response;
means located at an ITV server for determining whether the aggregate value satisfies the specific trigger event stored in association with the group profile;
means located at the ITV server for retrieving the event message corresponding to the specific trigger event based on a determination that the aggregate value satisfies the specific trigger event;
means located at the ITV server for selecting ITV data associated with the event message; and
means for transmitting the selected ITV data to a plurality of receivers associated with the plurality of viewers, wherein each of the plurality of receivers include means for retrieving the ITV content in response to the received ITV data, wherein the retrieved ITV content dynamically modifies, during the television program, the first type of interactive experience presented to the plurality of viewers with a modified interactive experience.

11. The system of claim 10, wherein the trigger event is a predetermined total number of viewers matching the group profile that interact with the interactive television program application.

12. The system of claim 10, wherein the modified interactive experience is configured to award an award to the plurality of viewers matching the group profile.

13. The system of claim 10, wherein the first type of interactive experience is an interactive game without the award awarded to the plurality of viewers matching the group profile.

14. The system of claim 10, wherein the group profile is associated with a particular gender.

15. An interactive television (ITV) system tailoring delivery of interactive content, the system comprising:
a first engine at an ITV server configured to:
specify a group profile directed to a group of viewers having a shared characteristic;
maintain a table of a plurality of trigger events and corresponding event messages, each trigger event triggering a specific interactive experience via the corresponding event message;
specify a specific trigger event for the group profile, the specific trigger event being selected from the plurality of trigger events;
store the specific trigger event in association with the group profile;
determine whether a plurality of viewers match the group profile by determining whether the plurality of viewers have the shared characteristic;
based on a determination that the plurality of viewers match the group profile, monitor and aggregate interactions with an interactive television program application by the plurality of viewers, the interactive television program application presenting the plurality of viewers with a first type of interactive experience during a television program, wherein the aggregating includes adding a value associated with a first interaction by a first one of the plurality of viewers to a second value associated with a second interaction by a second one of the plurality of viewers, and outputting an aggregate value in response;
a second engine at the ITV server configured to:
determine whether the aggregate value satisfies the specific trigger event stored in association with the group profile; and
based on a determination that the aggregate value satisfies the specific trigger event, retrieve the event message corresponding to the specific trigger event; and
a third engine at the ITV server configured to:
select ITV data associated with the event message; and
transmit the selected ITV data to a plurality of receivers associated with the plurality of viewers, wherein each of the plurality of receivers is configured to retrieve ITV content in response to the received ITV data, wherein the retrieved ITV content dynamically modifies, during the television program, the first type of interactive experience presented to the plurality of viewers with a modified interactive experience.

16. The system of claim 15, wherein the trigger event is a predetermined total number of viewers matching the group profile that interact with the interactive television program application.

17. The system of claim 15, wherein the modified interactive experience is configured to award an award to the plurality of viewers matching the group profile.

18. The system of claim 15, wherein the first type of interactive experience is an interactive game without the award awarded to the plurality of viewers matching the group profile.

19. The system of claim 15, wherein the group profile is associated with a particular gender.

20. A method for providing interactive content in an interactive television (ITV) system, the method comprising:
specifying, under control of a computer, a group profile directed to a group of viewers having a shared characteristic;

storing, under control of the computer, a milestone in association with the group profile;

determining, under control of the computer, whether a plurality of users interacting with an ITV application associated a television program match the group profile by determining whether the plurality of viewers have the shared characteristic, the ITV application presenting the plurality of viewers with a first type of interactive experience during the television program;

based on a determination that the plurality of viewers match the group profile, monitoring and aggregating interactions with the ITV application by the plurality of users that match the group profile, wherein the aggregating includes adding a value associated with a first interaction by a first one of the plurality of viewers to a second value associated with a second interaction by a second one of the plurality of viewers, and outputting an aggregate value in response;

determining, by an ITV server, whether the aggregate value achieves the specified milestone; and based on a determination that the aggregate value achieves the specified milestone, inserting ITV data into a video signal carrying the television program during the broadcast of the television program for delivery to a plurality of receivers associated with the plurality of viewers, wherein each of the plurality of receivers is configured to retrieve ITV content in response to the received ITV data, wherein the retrieved ITV content dynamically modifies, during the associated television program, the first type of interactive experience presented to the plurality of viewers with a modified interactive experience.

21. The method of claim 20, wherein the interactions of each of the monitored plurality of users contribute towards satisfying the specific trigger event.

22. The method of claim 20, wherein the modifying of the first type of interactive experience includes altering timing of presentation of particular elements of the ITV application from a broadcast head end, during the television program.

23. The method of claim 20, wherein the modifying of the first type of interactive experience includes altering an order of presentation of particular elements of the ITV application from a broadcast head end, concurrently during the μtelevision program.

24. A method for providing interactive content to a plurality of television systems accessed by a plurality of users, the method comprising:

specifying by an interactive television (ITV) server a group profile directed to a group of viewers having a shared characteristic;

storing by the ITV server a milestone in association with the group profile;

providing a broadcast station coupled to the ITV server a television program associated with an ITV application presenting the plurality of users with a first type of interactive experience during the television program;

receiving by the ITV server information on interactions by each of the plurality of users with the ITV application;

determining by the ITV server whether the plurality of users interacting with the ITV application match the group profile by determining whether the plurality of viewers have the shared characteristic;

monitoring and aggregating by the head end system interactions with the ITV application by the plurality of users that match the group profile, wherein the aggregating includes adding a value associated with a first interaction by a first one of the plurality of viewers to a second value associated with a second interaction by a second one of the plurality of viewers, and outputting an aggregate value in response;

determining by the ITV server whether the aggregate value by the monitored plurality of users achieves the specified milestone; and based on a determination that the aggregate value achieves the specified milestone, inserting ITV data into a video signal carrying the television program during the broadcast of the television program, the inserted ITV data being transmitted to the plurality of television systems, wherein each of the plurality of television systems is configured to retrieve ITV content in response to the received ITV data, wherein the retrieved ITV content dynamically modifies during the associated television program, the first type of interactive experience presented to the plurality of users with a modified interactive experience.

* * * * *

UNITED STATES PATENT AND TRADEMARK OFFICE
CERTIFICATE OF CORRECTION

PATENT NO.         : 7,861,259 B2                                                   Page 1 of 1
APPLICATION NO.    : 10/222445
DATED              : December 28, 2010
INVENTOR(S)        : Barone, Jr.

It is certified that error appears in the above-identified patent and that said Letters Patent is hereby corrected as shown below:

In Column 1, Line 49, delete "(Web)" and insert -- (WWW) --, therefor.

In Column 9, Line 38, in Claim 10, delete "viewers"" and insert -- viewers, --, therefor.

In Column 11, Line 38, in Claim 22, delete "end," and insert -- end --, therefor.

In Column 11, Line 42, in Claim 23, delete "end, concurrently" and insert -- end --, therefor.

In Column 11, Lines 42-43, in Claim 23, delete "μtelevision" and insert -- television --, therefor.

In Column 12, Line 9, in Claim 24, delete "providing" and insert -- providing by --, therefor.

Signed and Sealed this
Twenty-fifth Day of October, 2011

David J. Kappos
*Director of the United States Patent and Trademark Office*